United States Patent
Brecht et al.

(10) Patent No.: US 6,521,676 B2
(45) Date of Patent: *Feb. 18, 2003

(54) USE OF POLYETHER-POLYURETHANE FOR SAFETY CLOTHING

(75) Inventors: Klaus Brecht, Burscheid (DE); Hans-Detlef Arntz, Lohmar (DE); Bernhard John, Leverkusen (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,284
(22) PCT Filed: Nov. 10, 1997
(86) PCT No.: PCT/EP97/06233
§ 371 (c)(1), (2), (4) Date: May 17, 1999
(87) PCT Pub. No.: WO98/23659
PCT Pub. Date: Jun. 4, 1998

(65) Prior Publication Data

US 2002/0013377 A1 Jan. 31, 2002

(30) Foreign Application Priority Data

Nov. 22, 1996 (DE) ......................... 196 48 509

(51) Int. Cl.$^7$ .............. C08J 9/04; C08G 18/10; C08G 18/12; C08G 18/48; C08L 75/08
(52) U.S. Cl. .............. 521/159; 36/25 R; 36/28; 36/32 R; 521/51; 521/137; 521/174; 521/176; 521/172; 521/173; 525/123; 525/127; 525/131; 525/453; 525/455; 525/460; 528/60; 528/66; 528/76; 528/77; 528/80
(58) Field of Search .................... 521/174, 159, 521/51, 137, 176, 172, 173; 36/25 R, 28, 32 R; 525/123, 127, 131, 453, 455, 460; 528/60, 66, 76, 77, 80

(56) References Cited

U.S. PATENT DOCUMENTS

| 4,280,007 A | * | 7/1981 | Meisert et al. | 521/159 |
|---|---|---|---|---|
| 4,559,366 A | * | 12/1985 | Hostettler | 521/51 |
| 4,581,187 A | * | 4/1986 | Sullivan et al. | 264/46.4 |
| 4,590,219 A | * | 5/1986 | Nissen et al. | 521/51 |
| 4,627,178 A | * | 12/1986 | Sullivan et al. | 36/44 |
| 4,674,204 A | * | 6/1987 | Sullivan et al. | 36/44 |
| 4,694,589 A | * | 9/1987 | Sullivan et al. | 36/44 |
| 4,722,946 A | | 2/1988 | Hostettler | 521/158 |
| 4,746,681 A | | 5/1988 | Pilger et al. | 521/51 |
| 5,510,053 A | * | 4/1996 | Narayan et al. | 528/59 |
| 5,530,034 A | * | 6/1996 | Narayan et al. | 521/159 |
| 5,539,009 A | * | 7/1996 | Narayan et al. | 521/159 |
| 5,539,010 A | * | 7/1996 | Narayan et al. | 521/159 |

FOREIGN PATENT DOCUMENTS

| DE | 38 24 055 | 1/1990 |
|---|---|---|
| DE | 40 32 148 | 4/1992 |
| EP | 650 989 | 3/1995 |

* cited by examiner

Primary Examiner—Rabon Sergent
(74) Attorney, Agent, or Firm—Joseph C. Gil; Lyndanne M. Whalen; John E. Mrozinski, Jr.

(57) ABSTRACT

Safety clothing is produced by molding polyether-based plastic-forming compositions. Particularly preferred articles of safety clothing produced by this process are safety shoe soles.

4 Claims, No Drawings

USE OF POLYETHER-POLYURETHANE FOR SAFETY CLOTHING

This invention relates to the use of cellular to solid moulded plastics made from polyether PUR for the production of safety clothing, preferably safety shoe soles.

The production of moulded polyurethane-based plastics has been known prior art for many decades. These moulded plastics may be produced in a wide range of densities and hardnesses for various applications, for example as protective clothing.

The principal application for polyurethanes in safety clothing is as protective shoes. On the basis of existing standards (the EN 344 series), which lay down the structure and properties of safety shoes, the selection of materials has hitherto been restricted to the use of polyester PUR. The principal reason for excluding polyether PUR is its inadequate resistance to oil and petrol (EN 344, point 4.8.9, resistance to fuel).

However, polyester PUR or the components required for the production thereof by reaction injection moulding exhibit the following disadvantages:
- elevated viscosities of the components in the ready-to-process state results in unfavourable reproduction of shapes
- the elevated temperature of the components in the ready-to-process state, which is necessary for processing, reduces their pot life
- unsatisfactory resistance to hydrolysis and microbial attack, especially in agricultural use or in areas with a hot and humid climate, which also results in a restricted storage life of finished safety shoes
- poor low temperature flexibility of standard polyester PUR The production of polyether PUR using the reaction casting process or reaction injection moulding process, like polyester PUR processing, is part of the prior art. Depending upon requirements, polyester PUR is used at various densities and hardnesses in both single and double layer moulded sole and direct soling processes for the production of walking, leisure and sports shoes.

In connection with new developments of polyether-based PUR, such a PUR has surprisingly been found which exhibits sufficient fuel resistance for use in safety shoe applications.

The present invention provides the use of cellular to solid moulded polyether-based plastics by foam moulding to produce safety clothing.

Safety clothing complying with EN 344 series standards (fuel resistance in isooctane <12 vol. %) are, for example, safety shoes, boots, aprons etc..

This fuel resistance is achieved at outsole bulk densities of $\geq 800$ kg/m$^3$ with the polyester PUR system raw materials stated below by way of example.

The cellular to solid polyether polyurethane based moulded plastics are produced by foam moulding a reaction mixture prepared, for example, from
- a) a relatively high molecular weight polyether polyol component,
- b) a polyisocyanate component
- c) chain extenders,
- d) optionally blowing agents,
- e) activators and optionally
- f) further auxiliary substances and additives, wherein the starting materials are reacted while maintaining an isocyanate index of 70 to 130.

The relatively high molecular weight polyether polyol component a) has a hydroxyl functionality of 2.00 or substantially comprises a mixture having an average hydroxyl functionality of 2.02 to 2.95 prepared from
- aa) at least one polyether diol of the hydroxyl value range from 10 to 115, which was produced by propoxylating a difunctional starter and subsequently ethoxylating the propoxylation product while maintaining a weight ratio of propylene oxide to ethylene oxide of 60:40 to 85:15 and
- ab) at least one polyether triol of the hydroxyl value range from 12 to 56, optionally containing fillers based on styrene/acrylonitrile copolymers, polyureas or polyhydrazocarbonamides in a quantity of up to 20 wt. %, relative to the total weight of component a), which polyether triol was produced by propoxylating a trifunctional starter and subsequently maintaining a weight ratio of propylene oxide to ethylene oxide of 60:40 to 85:15.

Polyisocyanate component b) is a semi-prepolymer containing isocyanate groups and having an NCO content of 10 to 25 wt. %, produced by reacting (i) 4,4'-diisocyanatodiphenylmethane with (ii) a polyether component of the hydroxyl value range of 10 to 115 and an (average) hydroxyl functionality of 2.0 to 2.5, consisting of at least one polyether diol, produced by propoxylating a difunctional starter and optionally subsequently ethoxylating the propoxylation product using up to 40 wt. % of ethylene oxide, relative to the weight of the polyether diol, or a mixture of at least one such diol with at least one polyether triol, produced by propoxylating a trifunctional starter and optionally subsequently ethoxylating the propoxylation product using up to 40 wt. % of ethylene oxide, relative to the weight of the polyether triol and/or a polyester component of the hydroxyl value range from 28 to 115 and an average functionality of 2.0 to 2.5, wherein component (i) was optionally added before the reaction or to the reaction product with polypropylene glycols of the molecular weight range from 134 to 700 and/or by carbodiimidising a proportion of the isocyanate groups of liquefied 4,4'-diisocycanatodiphenylmethane in a quantity of up to 10 wt. %, relative to the weight of component (i).

1,2-Ethanediol and/or 1,4-butanediol and/or diethylene glycol and/or triethanolamine and/or diethyltolylenediamine are used as component c), while water and/or a physical blowing agent, for example R 134a® (hydrofluoro-alkane mixture), are optionally used as component d).

Activators e) which may be considered are the compounds known per se from polyurethane chemistry, such as for example triethylenediamine, N,N-dimethyl-benzylamine or organotin compounds, such as for example dibutyltin dilaurate or tin(II) octoate.

Further optionally used auxiliary substances and, additives f) which may be mentioned by way of example are surface-active substances, foam stabilisers, cell regulators, internal release agents, dyes, pigments, hydrolysis stabilisers, fungistatically and bacteriostatically active substances, light stabilisers, anti-oxidants and anti-static agents (quaternary ammonium compounds).

The polyurethanes are produced in accordance with the known prior art. This means in general that components a) and c) to f) are combined to produce a "polyol component" and reacted in a single stage with the polyisocyanate component b) in a closed mould, for example a closed metal or plastic mould, wherein conventional two-component mixing units are used. The quantity of the reaction mixture introduced into the mould and the quantity of the water optionally used as the blowing agent and/or of a physical blowing agent, for example R 134®, are calculated in this process in such a manner that moulded foams of a bulk density of ≧800 kg/m³ are obtained. The most important area of application is in shoe production, according to the invention for the production of cellular to solid outsoles for safety shoes. These shoes preferably have an outsole bulk density of ≧800 kg/m³ and, in a particular embodiment, are associated with a throughsole having a bulk density of ≧400 kg/m³.

EXAMPLES

The following Example illustrates formulation constituents for use in outsoles for safety shoes. An isocyanate index of 100 was maintained in all the Examples. Test sheets of dimensions 20×20×1 cm were taken as test specimens for determining mechanical properties and resistance to petrol (EN 344, point 4.8.9).

Starting Materials
Polyhydroxyl compounds a)

$a_1$ polyether diol, OH value 28, PO/EO weight ratio 70:30
$a_2$ polyether diol, OH value 28, PO/EO weight ratio 77:23

Polyisocyanate b)
Reaction product of 4,4'-diisocyanatodiphenylmethane (MDI) with tripropylene glycol, NCO content 23%.

EXAMPLE

The formulations for Examples 1 to 3 are shown in Table 1 below, while mechanical properties and petrol resistance are shown in Table 2.

TABLE 1

(all figures are parts by weight)

| | Example 1 | Example 2 | Example 3 |
|---|---|---|---|
| Component $a_1$ | 90.00 | 79.27 | 71.55 |
| Component $a_2$ | — | 10.00 | 20.00 |
| 1,4-Butanediol | 6.00 | 7.50 | — |
| 1,2-Ethanediol | — | 0.50 | — |
| Diethyltolylenediamine | — | — | 6.00 |
| Triethylenediamine | 1.80 | 0.60 | 0.20 |
| Dibutyltin dilaurate | 0.05 | 0.03 | 0.05 |
| Triethanolamine | 0.15 | — | 0.20 |
| Water | — | 0.10 | — |
| Tetraalkylammonium sulphate (Catafor CA 100) | 2.00 | 2.00 | 2.00 |
| Polyisocyanate b) | 33 | 44 | 26 |

TABLE 2

Mechanical properties

| | | Example 1 | Example 2 | Example 3 |
|---|---|---|---|---|
| Bulk density DIN 54320 | (kg/m³) | 1100 | 900 | 1080 |
| Hardness DIN 53505 | (Shore A) | 60 | 60 | 70 |
| Tensile strength DIN 53504 | (MPa) | 16 | 8 | 12 |
| Elongation at break DIN 53504 | (%) | 800 | 600 | 610 |
| Tear propagation strength DIN 53516 | (kN/m) | 18 | 10 | 20 |
| Fuel resistance EN 344 | (% change in volume) | 9.5 | 10.5 | 11.5 |

What is claimed is:
1. An article of safety clothing which is fuel resistant in accordance with test method DIN EN 344 comprising molded polyether polyurethane plastic having a bulk density greater than or equal to 800 kg/m³ which is produced by reacting:
 (1) a polyether polyol component;
 (2) a polyisocyanate component;
 (3) at least one chain extender;
 (4) at least one activator;
 (5) optionally, at least one blowing agent; and
 (6) optionally, at least one auxiliary substance or additive;
wherein the polyether polyol component has a hydroxyl functionality of 2.00 or is comprised of a mixture comprising:
 (a) at least one polyether diol having a hydroxyl value of from 10 to 115 produced by propoxylating a difunctional starter compound with propylene oxide thereby forming a propoxylation product and then ethoxylating the propoxylation product with ethylene oxide wherein the weight ratio of propylene oxide to ethylene oxide, based on the total weight of the polyether diol, is from 60:40 to 85:15; and
 (b) at least one polyether triol having a hydroxyl value of from 12 to 56, which optionally comprises up to 20 wt. %, based on the total weight of the polyether polyol component, of filler derived from styrene/acrylonitrile copolymers, polyureas or polyhydrazocarbonamides, wherein the polyether triol is produced by reacting a trifunctional starter compound with propylene oxide and ethylene oxide, in which the weight ratio of propylene oxide to ethylene oxide, based on the total weight of the polyether triol is from 60:40 to 85:15;
wherein the mixture has an average hydroxyl functionality of from 2.02 to 2.95; and
wherein the polyisocyanate component is a semi-prepolymer comprising isocyanate groups and having an NCO content of 10 and 25 wt. % produced by reacting:
 (i) 4,4'-diisocyanato-diphenylmethane with
 (ii) a polyether component having a hydroxyl value of 10 to 115 and an average hydroxyl functionality of 2.0 to 2.5, consisting of:
  (A) at least one polyether diol, produced by propoxylating a difunctional starter compound with propylene oxide to yield a propoxylation product and, optionally, subsequently ethoxylating the propoxylation product using up to 40 wt. % of ethylene oxide, based on the weight of the polyether diol, or
  (B) a mixture of (I) with (II) and/or (III), wherein: (I) is at least one polyether diol, produced by propoxylating a difunctional starter compound with propylene oxide to yield a propoxylation product and, optionally, subsequently ethoxylating the propoxylation product using up to 40 wt. % of ethylene oxide, based on the weight of the polyether diol; (II) is at least one polyether triol, produced by propoxylating a trifunctional starter compound with propylene oxide to yield a propoxylation product and, optionally, subsequently ethoxylating the propoxylation product using up to 40 wt. % of ethylene oxide, based on the weight of the polyether triol; and (III) is a polyester component having a hydroxyl value from 28 to 115 an average functionality of 2.0 to 2.5;
 optionally, wherein component (i) is added before the reaction or to the reaction product with polypropylene glycols having a molecular weight of 134 to 700 and/or a proportion of the isocyanate groups of liquefied 4,4'-diisocyanato-diphenylmethane is carbodiimidized, in a quantity of up to 10 wt. %, based on the weight of component (i).

2. The article of claim 1 which is in the form of a safety shoe outsole.

3. A shoe sole in which the outsole of claim 2 is associated with a throughsole having a bulk density of $\geq 400$ kg/m$^3$.

4. A process for the production of an article of safety clothing which is fuel resistant in accordance with test method DIN EN 344 and which has a bulk density greater than or equal to 800 kg/m$^3$ comprising foaming in a mold a polyether polyurethane plastic forming composition which is the reaction product of:

(1) a polyether polyol component;

(2) a polyisocyanate component;

(3) at least one chain extender;

(4) at least one activator;

(5) optionally, at least one blowing agent; and (6) optionally, at least one auxiliary substance or additive;

wherein the polyether polyol component has a hydroxyl functionality of 2.00 or is comprised of a mixture comprising:

(a) at least one polyether diol having hydroxyl value of from 10 to 115 produced by propoxylating a difunctional starter compound with propylene oxide thereby forming a propoxylation product and then ethoxylating the propoxylation product with ethylene oxide wherein the weight ratio of propylene oxide to ethylene oxide, based on the total weight of the polyether diol, is from 60:40 to 85:15; and (b) at least one polyether triol having a hydroxyl value of from 12 to 56, which optionally comprises up to 20 wt. %, based on the total weight of the polyether polyol component, of filler derived from styrene/acrylonitrile copolymers, polyureas or polyhydrazocarbonamides, wherein the polyether triol is produced by reacting a trifunctional starter compound with propylene oxide and ethylene oxide, in which the weight ratio of propylene oxide to ethylene oxide, based on the total weight of the polyether triol is from 60:40 to 85:15;

wherein the mixture has an average hydroxyl functionality of from 2.02 to 2.95; and wherein the polyisocyanate component is a semi-prepolymer comprising isocyanate groups and having an NCO content of 10 to 25 wt. % produced by reacting:

(i) 4,4'-diisocyanato-diphenylmethane with (ii) a polyether component having a hydroxyl value of 10 to 115 and an average hydroxyl functionality of 2.0 to 2.5, consisting of:

(A) at least one polyether diol, produced by propoxylating a difunctional starter compound with propylene oxide to yield a propoxylation product and, optionally, subsequently ethoxylating the propoxylation product using up to 40 wt. % of ethylene oxide, based on the weight of the polyether diol, or (B) a mixture of (I) with (II) and/or (III), wherein: (I) is at least one polyether diol, produced by propoxylating a difunctional starter compound with propylene oxide to yield a propoxylation product and, optionally, subsequently ethoxylating the propoxylation product using up to 40 wt. % of ethylene oxide, based on the weight of the polyether diol; (II) is at least one polyether triol, produced by propoxylating a trifunctional starter compound with propylene oxide to yield a propoxylation product and, optionally, subsequently ethoxylating the propoxylation product using up to 40 wt. % of ethylene oxide, based on the weight of the polyether triol; and (III) is a polyester component having a hydroxyl value from 28 to 115 and an average functionality of 2.0 to 2.5;

optionally, wherein component (i) is added before the reaction or to the reaction product with polypropylene glycols having a molecular weight of 134 to 700 and/or a proportion of the isocyanate groups of liquefied 4,4'-diisocyanato-diphenylmethane is carbodiimidized, in a quantity of up to 10 wt. %, based on the weight of component (i).

* * * * *